(12) United States Patent
Wadsworth

(10) Patent No.: US 11,433,624 B2
(45) Date of Patent: Sep. 6, 2022

(54) PEEN-FORMING OF THERMOPLASTIC COMPOSITE MATERIAL

(71) Applicant: SPIRIT AEROSYSTEMS, INC., Wichita, KS (US)

(72) Inventor: Mark Anthony Wadsworth, Sedan, KS (US)

(73) Assignee: SPIRIT AEROSYSTEMS, INC., Wichita, KS (US)

( * ) Notice: Subject to any disclaimer, the term of this patent is extended or adjusted under 35 U.S.C. 154(b) by 561 days.

(21) Appl. No.: 16/368,115

(22) Filed: Mar. 28, 2019

(65) Prior Publication Data
US 2020/0307121 A1    Oct. 1, 2020

(51) Int. Cl.
*B29C 67/00* (2017.01)
*B29K 101/12* (2006.01)

(52) U.S. Cl.
CPC ...... *B29C 67/0011* (2013.01); *B29K 2101/12* (2013.01)

(58) Field of Classification Search
None
See application file for complete search history.

(56) References Cited

U.S. PATENT DOCUMENTS

| 4,432,220 A * | 2/1984 | Loersch | B24C 1/00 |
| | | | 72/53 |
| 2016/0114370 A1* | 4/2016 | Kozaki | B21D 43/003 |
| | | | 72/310 |

OTHER PUBLICATIONS

Charles F. Barrett, "Peen Forming", 1984, Tool and Manufacturing Engineers Handbook, Special Forming Methods (Year: 1984).*
B. Cina, T. Kaatz, I. Eldror, "The effect of heating shot peened sheets and thin plates of aluminium alloys", 1990, Journal of Materials Science, 25 (Year: 1990).*
R. K. Pandey, M. N. Deshmukh, "Shot Peening and It's Impact on Fatigue Life of Engineering Components", Oct. 20, 2016, International Conference on Shot Peening and Blast Cleaning (Year: 2016).*
Oct. 20, 2016 Wayback Machine Screenshot of "Shot Peening and It's Impact on Fatigue Life of Engineering Components" (Year: 2016).*

* cited by examiner

*Primary Examiner* — Jacob T Minskey
*Assistant Examiner* — Adrien J Bernard
(74) *Attorney, Agent, or Firm* — Hovey Williams LLP

(57) ABSTRACT

A system for peen-forming of thermoplastic composite material is provided. The system includes a tool, a heater, and a peen-forming device. The thermoplastic composite material is positioned on the tool, which supports the thermoplastic composite material as it is being process. The tool has a surface to which a portion of the thermoplastic composite material is intended to conform. The heater is configured to heat the thermoplastic composite material while it is positioned on the tool to make the thermoplastic composite material more malleable. The peen-forming device directs particles against the thermoplastic composite material positioned on the tool so that the portion of the thermoplastic composite material conforms to the surface of the tool.

10 Claims, 5 Drawing Sheets

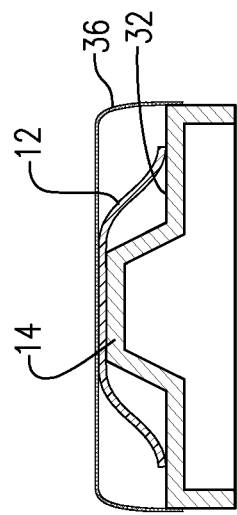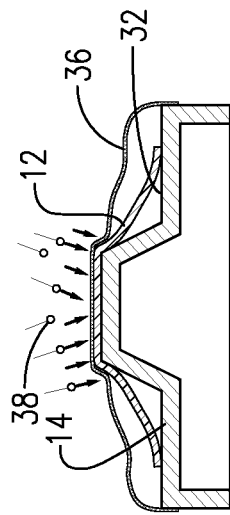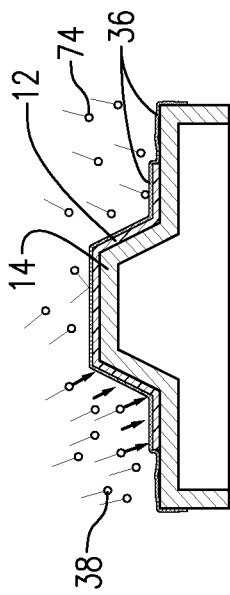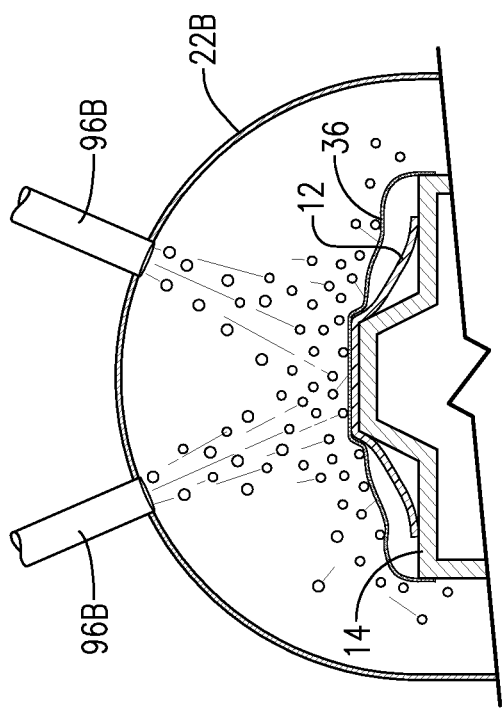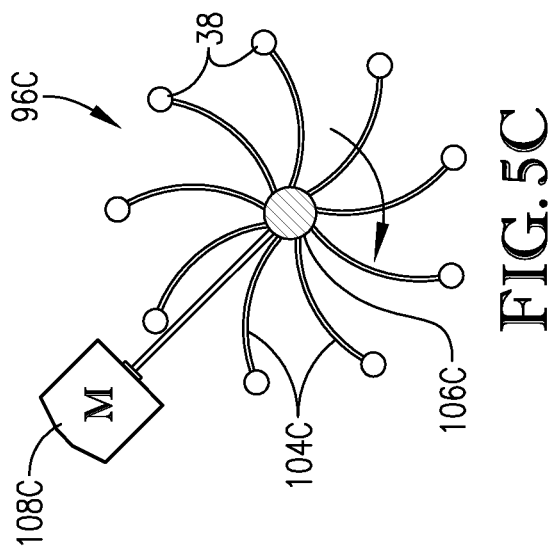

PEEN-FORMING OF THERMOPLASTIC COMPOSITE MATERIAL

BACKGROUND

Aircrafts and other vehicles often comprise large components made of thermoplastic composite material. Match-metal tooling is often used to form these components. Match-metal tooling molds the components by stamp-forming thermoplastic composite material into a desired shape with a press and requires two halves that together form an exact mold of the desired shape and that have precise drop-off locations. Therefore, match-metal tools often become obsolete when the design of the associated composite components change. Another problem with match-metal tooling is the sizes of some thermoplastic composite material components are too large for many presses and keeping the precise tolerances required becomes prohibitively expensive.

Another way of forming thermoplastic composite material components involves autoclave processing; however, autoclave processing is expensive and requires high temperature expendable materials, which are very costly and often prone to failure.

The background discussion is intended to provide information related to the present invention which is not necessarily prior art.

SUMMARY

The present invention solves the above-described problems and other problems by providing an improved system and method for forming large components from thermoplastic composite material without the use of match-metal tooling and autoclaves.

A system constructed in accordance with an embodiment of the present invention broadly comprises a tool for supporting thermoplastic composite material, a heater, and a peen-forming device. The tool includes a surface to which a portion of the thermoplastic composite material is intended to conform. The heater is configured to heat the tool and thermoplastic composite material.

The peen-forming device directs particles against the thermoplastic composite material after it has been heated so that the thermoplastic composite material conforms to the tool due to the momentum of the particles being transferred into the melted laminate. Because the heated thermoplastic composite material is deformable, the impact of the particles from the peen-forming device drives the heated thermoplastic composite material against the tool until a surface of the thermoplastic composite material is contiguous to the surface of the tool. The impact of the particles may also compact the thermoplastic composite material to a desired thickness by expelling the contained porosity while cooling it to below the melt point simultaneously.

The above-described system may also comprise a conveyor, a reclaiming hopper positioned below the peen-forming device, and a bucket elevator positioned adjacent the reclaiming hopper and the peen-forming device. The conveyor moves the tool and the thermoplastic composite material along a processing path from the heater and toward the peen-forming device, which enables forming of long thermoplastic composite material components. The reclaiming hopper collects used particles, thereby decreasing the cost of processing the thermoplastic composite material. The elevator feeds the collected particles to the peen-forming device.

Another embodiment of the invention is a method of peen-forming thermoplastic composite material. The method broadly comprises positioning thermoplastic composite material on a tool having a surface to which a portion of the thermoplastic composite material is intended to conform; heating the thermoplastic composite material; and directing particles against the thermoplastic composite material so that the portion of the thermoplastic composite material conforms to the surface of the tool. The directed particles and air entrained thereby may also remove heat from the part and tool such that the laminate solidifies while under pressure.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
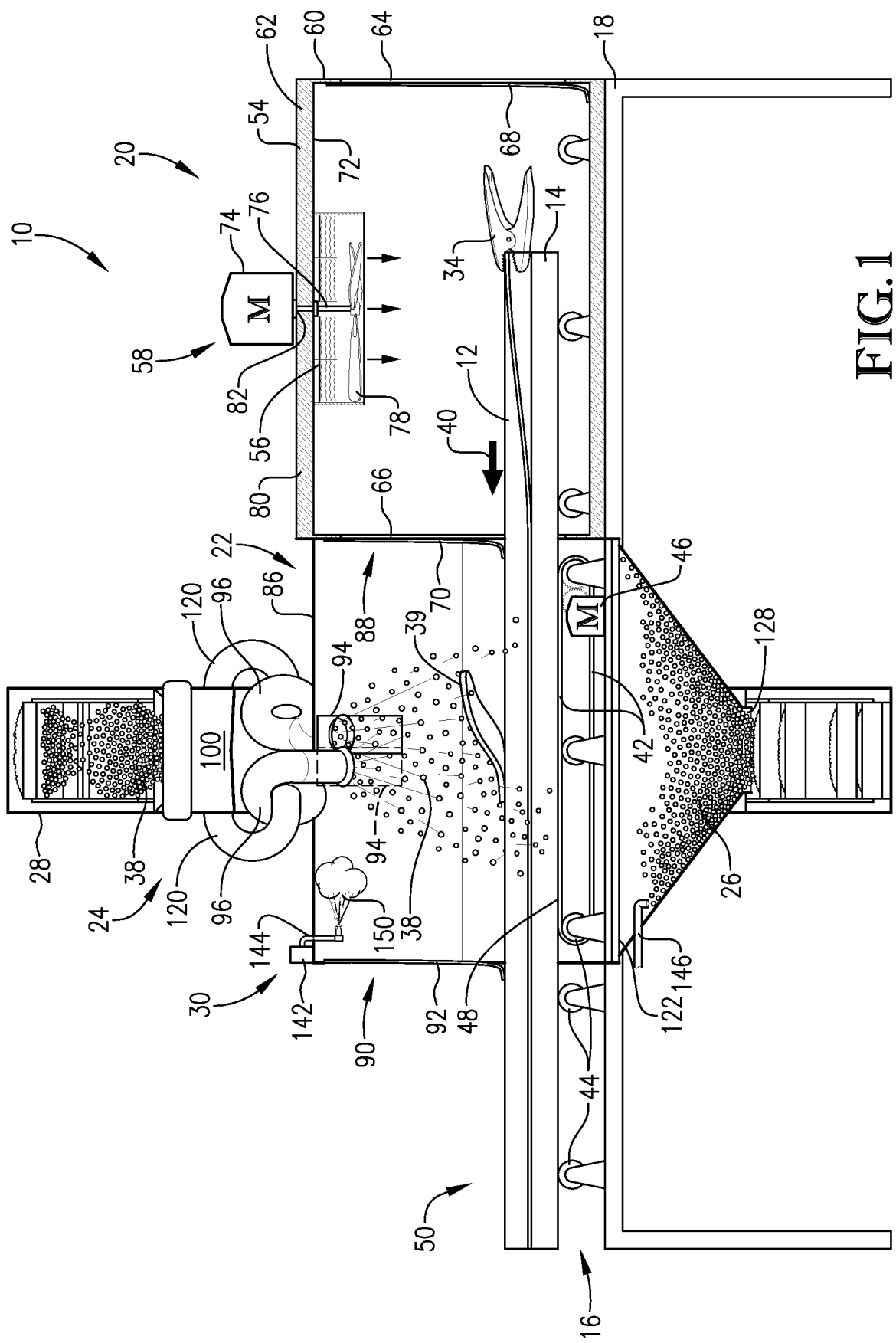
FIG. 1 is a side view of a peen-forming system constructed in accordance with embodiments of the invention.
Figure 7:
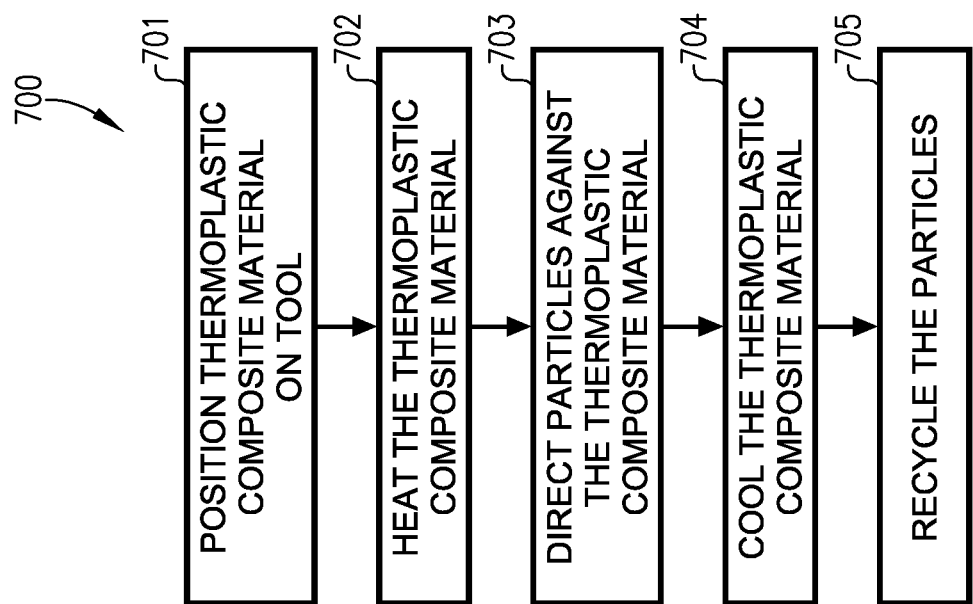

FIG. 5B fragmental is a front view of another embodiment of the blasting wheel of FIG. 5;

FIG. 5C is a front view of another embodiment of the blasting wheel of FIG. 5;

FIG. 6A is a front sectional view of a tool of the system of FIG. 1 showing a thermoplastic composite material before it has been heated;

FIG. 6B is a front sectional view of a tool of the system of FIG. 1 showing a thermoplastic composite material after it has been heated;

FIG. 6C is a front sectional view of a tool of the system of FIG. 1 showing a thermoplastic composite material after it has been peen-formed; and FIG. 7 is a flowchart illustrating at least a portion of the steps of a method for peen-forming thermoplastic composite material.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, a system 10 for peen-forming of thermoplastic composite material 12 constructed in accordance with an embodiment of the invention is illustrated. The system 10 heats, forms, compacts, and cools thermoplastic composite material 12 to form a part, such as an aircraft component, a watercraft component, a vehicular component, or the like. The thermoplastic composite material 12 may comprise one or more thermoplastic plies tacked together via spot heating and/or ultrasonic welding in a desired sequence and/or orientation. An embodiment of the system 10 broadly comprises a tool 14 supported on a conveyor 16, a platform 18, a heater 20, an enclosure 22, one or more peen-forming devices 24, a reclaiming hopper 26, a bucket elevator 28, and a cooling system 30.

The tool 14 supports the thermoplastic composite material 12 and includes a surface 32 (shown in FIG. 2) to which portions of the thermoplastic composite material 12 conforms. The thermoplastic composite material 12 may be secured to the tool 14 using a restraining means 34, such as one or more clamps, pins, or the like. The tool 14 may be made of any hard material including dense plastic, metal, or the like.

Figure 2:
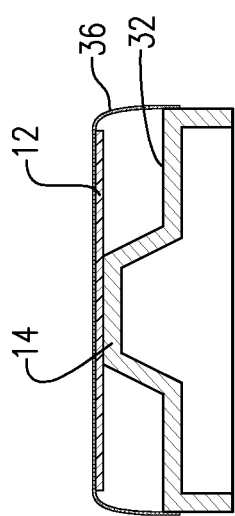
FIG. 2 is a front sectional view of a tool of the system of FIG. 1.

As depicted in FIG. 2, a protective cover 36 may be positioned over the thermoplastic composite 12 to protect the thermoplastic composite material 12 from abrasion during peen-forming and prevent particles 38 from getting between plies of the thermoplastic composite material 12 or between the thermoplastic composite material 12 and the tool 14 or from adhering to the surface of the thermoplastic composite. The protective cover 36 may be made of foil or another material that is deformable so that the peen-forming device 24 can still cause the thermoplastic composite material 12 to conform to the surface 32 of the tool 14. The protective cover 36 may be positioned over the thermoplastic composite material 12 before or after heating of the thermoplastic composite material 12. The protective cover 36 may also be secured to the tool 14 in a manner that prevents it from getting caught between the tools 14 and the thermoplastic composite material 12. The protective cover 36 may be sealed to the tool 14 and be large enough to completely cover the thermoplastic composite material 12 throughout the peen-forming process.

Figure 3:
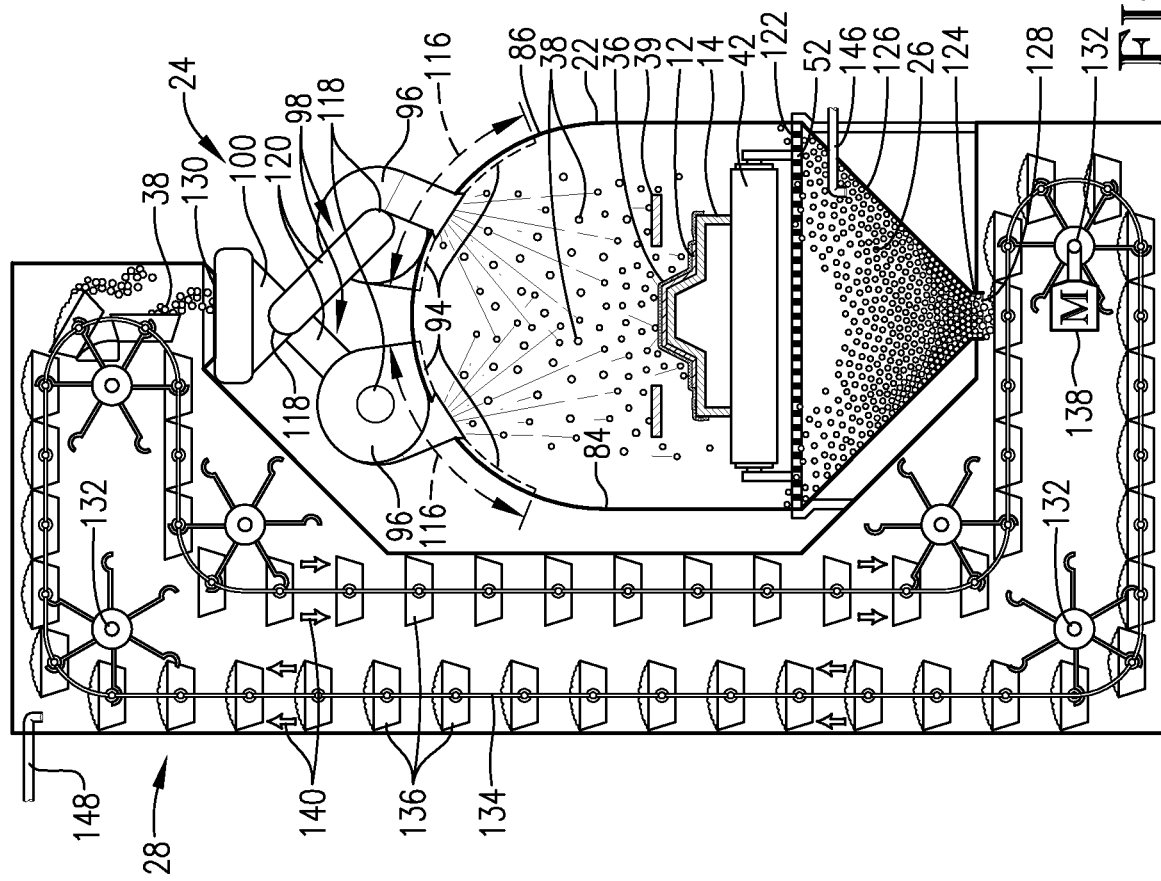
FIG. 3 is a front view of the system of FIG. 1.

Turning to FIG. 3, the conveyor 16 supports the tool 14 while the thermoplastic composite material 12 is being processed. The conveyor 16 causes the thermoplastic composite material 12 and the tool 14 to move in the direction indicated by arrow 40. The conveyor 16 may include a conveyor belt 42, a plurality of pulleys 44, and a conveyor motor 46. The conveyor belt 42 may engage two or more pulleys 44 so that the conveyor belt 42 can encircle the pulleys 44 and provide a moving upper surface 48 that engages the tool 14 and pulls the tool 14 in the direction of arrow 40. The conveyor motor 46 is coupled with one of the pulleys 44 to drive the pulley 44 and thereby drive the conveyor belt 42. The conveyor 16 may extend a substantial length of the platform 18 so that the thermoplastic composite material 12 and tool 14 can be moved from the heater 20, under the peen-forming device 24, and to a cooling region 50. This enables peen-forming of long thermoplastic composite material components.

The platform 18 supports the conveyor 16 and may include one or more grates 52 (shown in FIG. 3) that allow particles 38 from the peen-forming device 24 to pass. The platform 18 may be elevated relative to a reclaiming hopper 26 so that the particles 38 fall through the grates 52 and into the reclaiming hopper 26. The platform 18 may have a width that is greater than a width of the conveyor 16 so that particles 38 from the peen-forming device 24 may fall into the grates 52 of the platform 18.

The heater 20 is supported on or near the platform 18 and is provided for heating the thermoplastic composite material 12 so that it is more malleable. The heater 20 may use a combination of conduction, radiation, and convection heating. The heater 20 may include an enclosure 54, one or more heating elements 56, and one or more fans 58. The enclosure 54 may include a plurality of walls 60 and a ceiling 62 that collectively partially surround the tool 14, thermoplastic composite material 12, and conveyor 16. The enclosure 54 may include a first opening 64 and a second opening 66 through which the thermoplastic composite material 12 and tool 14 pass in a direction indicated by arrow 40. A first flap 68 may substantially cover the first opening 64 for keeping heat inside the enclosure 54 and allowing the thermoplastic composite material 12 and/or tool 14 to pass through the first opening 64. A second flap 70 may substantially cover the second opening 66 for keeping heat inside the enclosure 54 and allowing the heated thermoplastic composite material 12 and tool 14 to pass through the second opening 66. The heating elements 56 may be attached to a surface 72 of the ceiling 62.

The fan 58 includes a fan motor 74, a drive shaft 76, and fan blades 78. The fan motor 74 may be attached to an exterior surface 80 of the enclosure 54 and provide torque to the drive shaft 76. The drive shaft 76 may be received by the motor 54 and extend through a hole 82 in the ceiling 62, past the heating elements 56, and connect to the fan blades 78 just below the heating elements 56. The drive shaft 76 passes the torque from the motor 54 to the blades 78 so that the blades 78 spin and push heated air from the heating elements 56 toward the thermoplastic composite material 12. The heater 20 may be configured to heat the thermoplastic composite material 12 to a melting temperature of matrix resin of the thermoplastic composite material 12.

The enclosure 22 contains accelerated particles 38 and directs any rebounding particles 38 into the grates 52 of the platform 18. The enclosure 22 includes walls 84 and a top 86 that substantially enclose the thermoplastic composite material 12 and tool 14 along the processing path 40. The enclosure 22 includes an entrance 88 adjacent the second opening 66 of the heater 20 for allowing the thermoplastic composite material 12 and tool 14 to enter the enclosure 22. The enclosure 22 also includes an exit 90 through which the thermoplastic composite material 12 and tool 14 may leave the enclosure 22. A flap 92 may substantially cover the exit 90 to prevent particles 38, cooling substance, and/or heat from leaving the enclosure 22. The enclosure 22 may also include a pair of windows 94 at its top 86. The windows 94 allow the one or more peen-forming devices 24 to direct the particles 38 at different portions of the thermoplastic composite material 12 and at different angles.

Additionally, the enclosure 22 may be immediately adjacent the enclosure 54 of the heater 20, or at a distance, or even share the same walls 60, 84 without departing from the scope of the present invention. For example, the system 10 may not include a conveyor 16, and the heater 20 and peen-forming device 24 may be in the same enclosure. In certain applications, it may be advantageous for the enclosures 22, 54 to be immediately adjacent or close so that some heat from the heater 20 is present in the enclosure 22. This may make it so that the thermoplastic composite material 12 does not cool too quickly. It may also keep the thermoplastic composite material 12 malleable to aid in the peen-forming process so that the thermoplastic composite material 12 conforms to the surface 32 faster and/or easier. However, for some applications, it may be advantageous to have the enclosures 22, 54 separate and at a distance so as to reduce heat in the enclosure 22 due to heat escaping from the heater 20. Such a configuration may be advantageous when the thermoplastic composite material 12 requires faster cooling, such as, for example, to prevent defects. It is foreseen that any number of configurations may be used without departing from the scope of the present invention, depending on the application.

The peen-forming devices 24 direct particles 38 against the thermoplastic composite material 12 and/or protective cover 36 so that the thermoplastic composite material 12 conforms to the surface 32 of the tool 14. The particles 38 may be small pieces of solid material, such as shot, beads, balls, or the like, and the particles may be made of rubber, plastic, metal, or the like. Each peen-forming device 24 may include a blast wheel 96, a movable arm 98, and a base 100. The system 10 may include any number of peen-forming devices 24 without departing from the scope of the present invention.

Figure 5A:
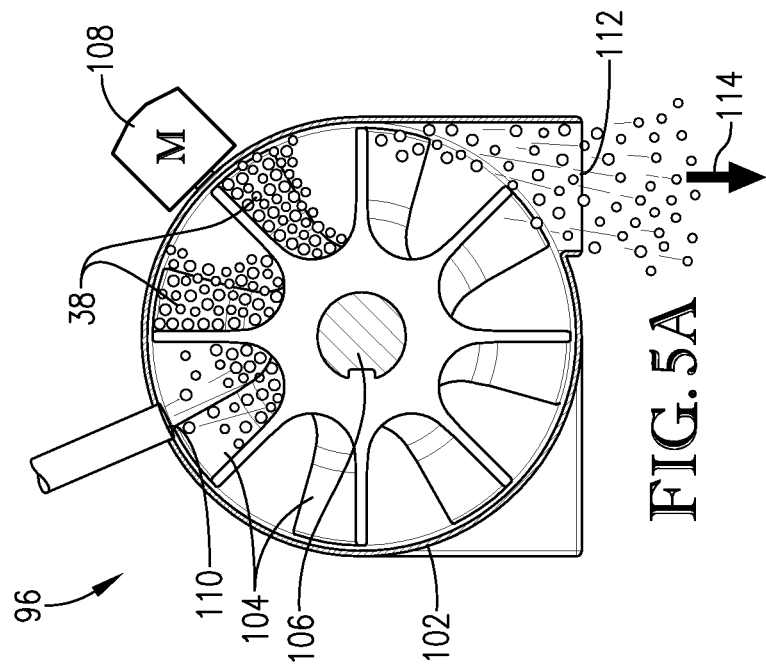
FIG. 5A is a front view of a blasting wheel of the system of FIG. 1.

The blast wheels 96 accelerate the particles 38 to be directed at the thermoplastic composite material 12. As depicted in FIG. 5A, each blast wheel 96 may include a housing 102, a propeller 104, a drive shaft 106, and a motor 108. The propeller 104 is driven by the drive shaft 106, which is in turn driven by the motor 108. The propeller 104 is configured to spin so that the particles 38 entering the housing 102 are struck and/or accelerated by the spinning propeller 104. The housing 102 may include a receptacle 110 and an outlet 112. The receptacle 110 receives particles 38 therethrough, and the outlet 112 allows accelerated particles 38 to exit the housing 102 in a direction 114 substantially normal to the cross section of the outlet 112 and into the enclosure 22.

The movable arms 98 connect the blast wheels 96 to the base 100 and enable the blast wheels 96 to move relative to the thermoplastic composite material 12 and enclosure 22 as indicated by arrows 116. The movable arms 98 may include one or more joints 118 and a conduit 120. The joints 118 enable movement and/or articulation of the arms 98. The conduit 120 delivers particles 38 to the receptacle 110 of its respective blast wheel 96. The arms 98 may be controlled using one or more servo motors, pneumatic systems, hydraulic systems, or the like.

Figure 4:
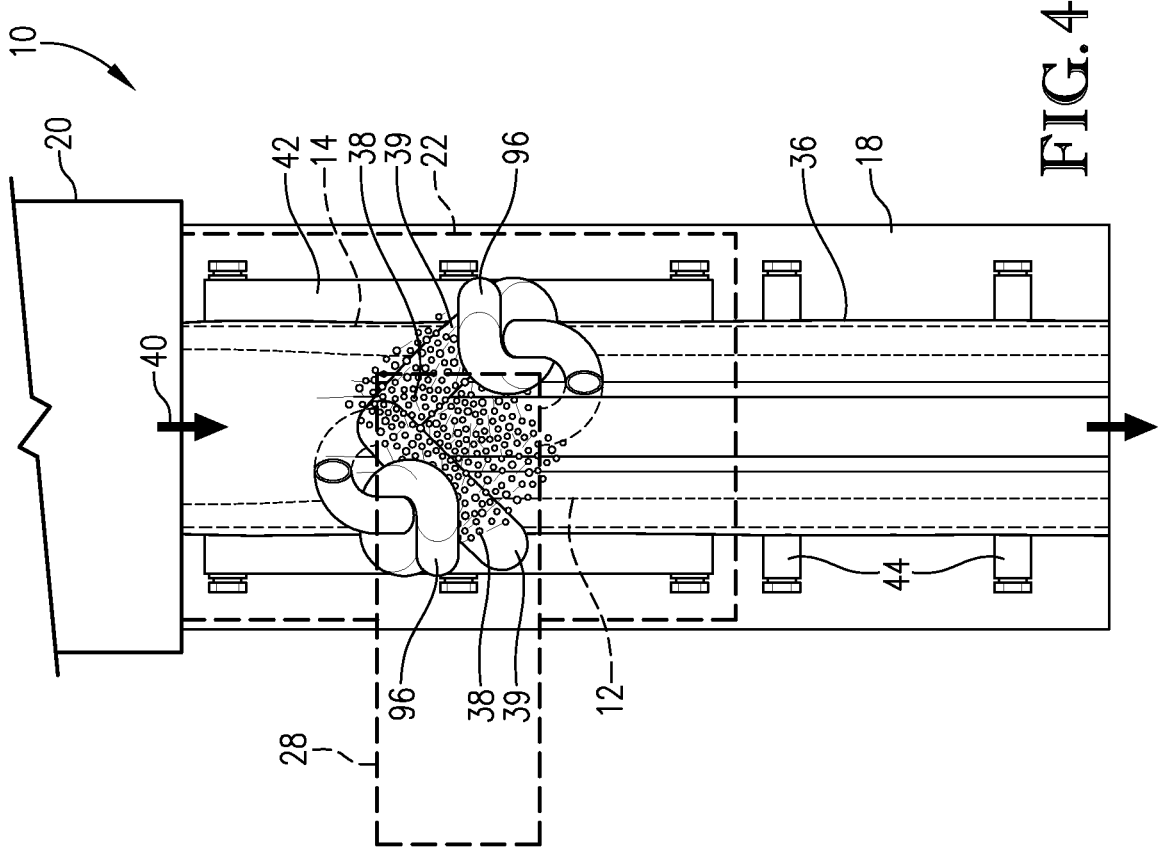
FIG. 4 is a top view of the system of FIG. 1.

The peen-forming devices 24 may direct the particles 38 at multiple locations on the thermoplastic composite material 12 progressively to avoid bridging and wrinkling of the thermoplastic composite material 12. Specifically, in the configuration shown in FIG. 2 the shot would be directed first at the center and progressively farther outboard over the male radii in both directions then push the material into the female tool radius before compacting and forming the outboard flanges last. Additionally, the peen-forming devices 24 may direct the particles 38 so that the particles 38 strike the thermoplastic composite material 12 at an angle normal to the surface of the thermoplastic composite material 12 to maximize compaction force on the thermoplastic composite material 12. The peen-forming devices 24 may also direct the particles 38 so that they strike the thermoplastic composite material 12 at a non-normal angle relative to the surface of the thermoplastic composite material 12 to promote material tensioning and to avoid wrinkles. The system 10 may also incorporate a blocking shield 39 to control the particle pattern and prevent stray particles from impacting the protective cover 36 in locations not conducive to forming the thermoplastic without bridging or wrinkling. The blocking shield 39 may be positioned above the thermoplastic composite material 12 and be adjustable for any orientation above the thermoplastic composite material 12. For example, the blocking shield 39 may extend at a downward angle toward the thermoplastic composite material 12 so that the particles 38 bounce away from untouched portions of the thermoplastic composite material 12. While FIGS. 1, 3, and 4 depict two peen-forming devices 24, any number of peen-forming devices 24 or other particle-accelerating devices may be used without departing from the scope of the present invention.

Other methods and devices for accelerating and/or directing the particles 38 at the thermoplastic composite material 12 may be used without departing from the scope of the present invention. For example, the peen-forming device 24 may include pneumatic shotguns 96B that accelerate particles using pressurized gas, as shown in FIG. 5B. The peen-forming device 24 may also include one or more rotary brush 96C having cords 104C attached to particles 38 and to a drive shaft 106C so that the cords 104C swing the particles 38 about the drive shaft 106C when the drive shaft 106C is driven by its motor 108C, as shown in FIG. 5C. The orbiting particles 38 strike the thermoplastic composite material 12 to cause the thermoplastic composite material 12 to conform to the surface 32 of the tool 14.

The reclaiming hopper 26 collects particles 38 that fall through the grates 52 of the platform 18. The reclaiming hopper 26 includes a top opening 122 positioned below the grates 52 and a bottom opening 124 defined by sloped walls 126 forming a funnel-like shape. The used particles 38 fall through the grates 52, into the top opening 122, and are directed by the sloped walls 126 through the bottom opening 124.

As shown in FIG. 3, the bucket elevator 28 receives the collected particles 38 from the reclaiming hopper 26 and feeds them to the peen-forming device 24. The bucket elevator 28 may be a c-configuration bucket elevator 28 and include an inlet 128, an outlet 130, a plurality of pulleys 132, a belt 134, a plurality of buckets 136, and a motor 138. The inlet 128 is positioned below the bottom opening 124 of the reclaiming hopper 26 and receives the collected particles 38. The pulleys 132 engage the belt 134 so that the belt 134 encircles the pulleys 132 in a direction indicated by arrows 140. The buckets 136 are pivotally connected to the belt 134 and travel with the belt 134 in the same direction 140. The buckets 136 receive the collected particles 38 at the inlet 128, travel up to near the outlet 130 while maintaining a substantially upright orientation to avoid spilling the particles 38, and are configured to tip proximate the outlet 130 so that the particles 38 are poured out of the outlet 130 and fed to the peen-forming device 24. The motor 138 drives at least one of the pulleys so that it engages the belt 134 to cause it to encircle the pulleys 132. The bucket elevator 28 is depicted as having pivoting buckets 136 and a c-configuration; however, the bucket elevator 28 may have any number of configurations and bucket types without departing from the scope of the present invention.

The cooling system 30 cools the thermoplastic composite material 12, the tool 14, and/or particles 38. The cooling system 30 includes cooling substance source 142 and one or more nozzles 144, 146, 148 coupled to the source 142 for introducing the cooling substance 150. The cooling substance source 142 may be a tank, reservoir, gas/plumbing line, or the like. The nozzles 144, 146, 148 may include controllable valves, gas nozzles, liquid nozzles, atomizers, etc. for spraying the cooling substance 150. One of the nozzles 144 may be positioned in the enclosure 22 for cooling the thermoplastic composite material 12. The nozzle 146 in the reclaiming hopper 26 cools the collected particles 38. The nozzle 148 in the bucket elevator 28 may also cool the collected particles 38 prior to being accelerated at the thermoplastic composite material 12.

An exemplary way to use the above-described system will now be described. The thermoplastic composite material 12 is pinned to the tool 14 using the restraining means 34. The protective cover 36 is then placed over and sealed to the tool 14. The tool 14 is placed on the conveyor 16 which pulls the tool 14 and the attached thermoplastic composite material 12 and protective cover 36 into the heater 20 through the first opening 64. The heater 20 heats the thermoplastic composite material 12 to a melting temperature of matrix resin of the thermoplastic composite material 12. This causes the thermoplastic composite material 12 to be malleable, as shown in FIG. 6A. Once the thermoplastic composite material 12 has been heated to the melting point, the conveyor 16 moves the thermoplastic composite material 12 out of the heater 20 and beneath the peen-forming device 24. The peen-forming device 24 directs the particles 38 at the thermoplastic composite material 12 using the blast wheel 96. The particles 38 strike the protective cover 36 overlaying the thermoplastic composite material 12, thereby causing the thermoplastic composite material 12 to be driven against the surface 32 of the tool 14, as depicted in FIG. 6B. The peen-forming device 24 may direct the particles 38 to strike the thermoplastic composite material 12 at different angles and locations by, for example, repositioning the blast wheel 96 at a different location along the path 110. The particle pattern may also be controlled by blast wheel orientation or particle blocking shields to promote progressive compaction where the shot impacts the protective cover in a chevron pattern that compacts the thermoplastic composite first at the center and progressing outboard to avoid bridging the female radius. This ensures that the thermoplastic composite material 12 conforms to portions of the surface 32 with female radii, as shown in FIG. 6C.

The used particles 38 may fall through the grates 52 of the platform 18 and into the reclaiming hopper 26. The reclaiming hopper 26 stores the collected particles 38 and directs them to the inlet 128 of the bucket elevator 28. The bucket elevator 28 receives the collected particles 38 and transports them back to the peen-forming device 24.

The particles 38 may cool the thermoplastic composite material 12 as they strike it. For additional cooling, the cooling system 30 may release a cooling substance 150 into the enclosure 22 of the peen-forming device 24, the reclaiming hopper 26, and/or the bucket elevator 28 using the nozzles 144, 146, 148.

Once the thermoplastic composite material 12 is sufficiently conformed to the surface 32 of the tool 14 and/or cooled, the conveyor 16 transports the tool 14, thermoplastic composite material 12, and protective cover 36 out of the enclosure 22 into the finishing region 50.

The flow chart of FIG. 7 depicts the steps of an exemplary method 700 of forming a component with thermoplastic composite material 12. In some alternative implementations, the functions noted in the various blocks may occur out of the order depicted in FIG. 7. For example, two blocks shown in succession in FIG. 7 may in fact be executed substantially concurrently, or the blocks may sometimes be executed in the reverse order depending upon the functionality involved. In addition, some steps may be optional.

The method 700 is described below, for ease of reference, as being executed by exemplary devices and components introduced with the embodiments illustrated in FIGS. 1-6. For example, the steps of the method 700 may be performed by the heater 20, conveyor 16, peen-forming device 24, reclaiming hopper 26, bucket elevator 28, and cooling system 30 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium (s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 701, the thermoplastic composite material 12 is positioned on the surface 32 of the tool 14. A portion of the thermoplastic composite material 12 is intended to conform to the surface 32 of the tool 14 so that a surface of at least a portion of the thermoplastic composite material 12 is contiguous with the surface 32 of the tool 14. The thermoplastic composite material 12 may be pinned to the tool 14 using the restraining means 34. Step 701 may also include placing the protective cover 36 over the thermoplastic composite material 12 to prevent abrasions and prevent particles 38 from getting between the thermoplastic composite material 12 and the tool 14 or between plies of the thermoplastic composite material 12.

Referring to step 702, the thermoplastic composite material 12 is heated with the heater 20. The thermoplastic composite material 12 and/or the tool 14 may be heated until the thermoplastic composite material 12 reaches the melting temperature of the matrix resin of the thermoplastic composite material 12. This step may include blowing air toward the thermoplastic composite material 12 using the fan 58.

Referring to step 703, the particles 38 may be directed against the thermoplastic composite material 12 so that the portion of the thermoplastic composite material 12 conforms to the surface 32 of the tool 14. The particles 38 may be accelerated and directed by the blast wheel 96 of the peen-forming device 24. The particles 38 may be directed at different locations of the thermoplastic composite material 12 and at different angles relative to the thermoplastic composite material 12. Additionally, the particles 38 may be directed at two different locations of the thermoplastic composite material 12 simultaneously using multiple peen-forming devices 24 to avoid bridging and wrinkling of the thermoplastic composite material 12. Step 703 may include removing the thermoplastic composite material 12, tool 14, and protective cover 36 from the heater 20 via the conveyor 16.

Referring to step 704, the thermoplastic composite material 12 may be cooled. The thermoplastic composite material 12 and/or the tool 14 may be cooled using the contact between the particles 38 and/or the cooling system 30. The thermoplastic composite material 12 may be cooled by spraying the cooling substance 150 at the thermoplastic composite material 12 using the nozzle 144. The thermoplastic composite material 12 may be cooled by cooling the particles 38 via nozzle 146 or nozzle 148 and directing the cooled particles 38 at the thermoplastic composite material 12. The rate of particles 38 directed against the thermoplastic composite material 12, the temperature of the particles 38, the temperature of air in the enclosure 22, the temperature of the heater 20, and a movement of the thermoplastic composite material 12 via the conveyor 16 may be adjusted in order to achieve a desired cooling rate of the thermoplastic composite material 12.

Referring to step 705, the particles 38 may be recycled. This step may include collecting the particles 38 that fall through the grates 52 in the reclaiming hopper 26. This step may also include transporting the collected particles 38 back to the peen-forming device 24 via the bucket elevator 28. Step 705 may include cooling of the collected particles via nozzle 146 or nozzle 148.

The method 700 may include additional, less, or alternate steps and/or device(s), including those discussed elsewhere herein.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for peen-forming components from thermoplastic composite material, the system comprising:
   a tool that supports the thermoplastic composite material, the tool comprising a surface to which a portion of the thermoplastic composite material is intended to conform;
   a heater configured to heat the thermoplastic composite material;
   a peen-forming device that directs particles against the thermoplastic composite material after it has been heated so that the portion of the thermoplastic composite material conforms to the surface of the tool; and
   a cooling system that directs a cooling substance at the thermoplastic composite material while the thermoplastic composite material is being struck by the particles.

2. The system of claim 1, the peen-forming device comprising a rotary slinger having fan blades that sling the particles toward the thermoplastic composite material when the rotary slinger rotates.

3. The system of claim 1, wherein the peen-forming device is moveable relative to the tool to cause the particles to strike the thermoplastic composite material at an angle normal to a surface of the thermoplastic composite material to maximize compaction force.

4. The system of claim 1, wherein the peen-forming device is moveable relative to the tool to cause the particles to strike the thermoplastic composite material at a non-normal angle to a surface of the thermoplastic composite material to promote material tensioning and avoid wrinkles.

5. The system of claim 1, the peen-forming device comprising two heads that direct the particles at the thermoplastic composite material progressively to avoid bridging and wrinkling of the thermoplastic composite material.

6. The system of claim 1, further comprising a conveyor that moves the tool and the thermoplastic composite material along a processing path from the heater and toward the peen-forming device.

7. The system of claim 6, wherein the peen-forming device is positioned proximate to the heater along the processing path so that the thermoplastic composite material is partially heated by heat exiting the heater while the particles from the peen-forming device strike the thermoplastic composite material.

8. The system of claim 6, further comprising a reclaiming hopper positioned below the conveyor that collects particles accelerated at the thermoplastic composite material, and a bucket elevator positioned adjacent the peen-forming device and reclaiming hopper that feeds collected particles to the peen-forming device.

9. The system of claim 8, the recycling system comprising a particle cooler that cools the collected particles.

10. A system for peen-forming thermoplastic composite material, the system comprising:
    a tool that supports the thermoplastic composite material, the tool comprising a surface to which a portion of the thermoplastic composite material is intended to conform;
    a heater configured to heat the thermoplastic composite material;
    a peen-forming device comprising two moveable rotary slingers that direct particles toward the thermoplastic composite material at multiple angles and locations, each rotary slinger comprising fan blades that sling the particles against the thermoplastic composite material when the rotary slinger rotates causing the portion of the thermoplastic composite material to conform to the surface of the tool;
    a conveyor that moves the tool and the thermoplastic composite material along a processing path from the heater and toward the peen-forming device;
    a reclaiming hopper positioned below the peen-forming device that collects used particles;
    a bucket elevator positioned adjacent the reclaiming hopper and the peen-forming device that feeds collected particles to the peen-forming device;
    a particle cooler that cools collected particles; and
    a cooling system that directs a cooling substance at the thermoplastic composite material while the thermoplastic composite material is below the peen-forming device.

* * * * *